United States Patent
Lee et al.

(10) Patent No.: US 9,043,860 B2
(45) Date of Patent: May 26, 2015

(54) METHOD AND APPARATUS FOR EXTRACTING ADVERTISEMENT KEYWORDS IN ASSOCIATION WITH SITUATIONS OF VIDEO SCENES

(75) Inventors: Hyung-dong Lee, Seoul (KR); Jung-tae Lee, Seoul (KR); Hee-seon Park, Seoul (KR); Young-in Song, Seoul (KR); Hae-chang Rim, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 1146 days.

(21) Appl. No.: 12/698,668

(22) Filed: Feb. 2, 2010

(65) Prior Publication Data

US 2010/0217671 A1 Aug. 26, 2010

(30) Foreign Application Priority Data

Feb. 23, 2009 (KR) .................. 10-2009-0014976

(51) Int. Cl.
*H04N 7/16* (2011.01)
*H04H 20/10* (2008.01)
(Continued)

(52) U.S. Cl.
CPC ............. *H04H 20/10* (2013.01); *H04N 21/235* (2013.01); *G06Q 30/02* (2013.01); *G06Q 30/0255* (2013.01); *G11B 27/3027* (2013.01); *H04H 60/37* (2013.01); *H04H 60/58* (2013.01);
(Continued)

(58) Field of Classification Search
CPC ............. G06Q 30/02; G06Q 30/0251; G06Q 30/0255; G06Q 30/0273; G06Q 30/0275; G06Q 30/0277; H04N 21/235

USPC .................. 705/14.53, 14; 725/136
See application file for complete search history.

(56) References Cited

U.S. PATENT DOCUMENTS 5,828,839 A 10/1998 Moncreiff
6,606,644 B1 8/2003 Ford et al.
(Continued)

FOREIGN PATENT DOCUMENTS

JP 2008-134825 6/2008
JP 2008-160337 A 7/2008
(Continued)

OTHER PUBLICATIONS

"Content-Based Temporal Processing of Video" by Robert A. Joyce; A dissertation presented to the faculty of Princeton University; Nov. 2002; UMI Microform 3060073; ProQuest Information and Learning Company.*

(Continued)

*Primary Examiner* — John G Weiss
*Assistant Examiner* — Michael Stibley
(74) *Attorney, Agent, or Firm* — NSIP Law (57) ABSTRACT

A method and apparatus for extracting advertisement keywords in association with situations of scenes of video include: establishing a knowledge database including a classification hierarchy for classifying situations of scenes of video and an advertisement keyword list, segmenting a video script corresponding to a received video in units of scenes, and determining a situation corresponding to each scene with reference to the knowledge database, and extracting an advertisement keyword corresponding to the situation of a scene of the received video with reference to the knowledge database.

11 Claims, 6 Drawing Sheets

(51) Int. Cl.

| | | |
|---|---|---|
| *H04N 21/235* | (2011.01) | |
| *G06Q 30/02* | (2012.01) | |
| *G11B 27/30* | (2006.01) | |
| *H04H 60/37* | (2008.01) | |
| *H04H 60/58* | (2008.01) | |
| *H04H 60/59* | (2008.01) | |
| *H04H 60/63* | (2008.01) | |
| *H04N 21/81* | (2011.01) | |
| *H04N 21/8405* | (2011.01) | |
| *H04N 21/845* | (2011.01) | |

(52) U.S. Cl.
 CPC ............... *H04H60/59* (2013.01); *H04H 60/63* (2013.01); *H04N 7/163* (2013.01); *H04N 21/812* (2013.01); *H04N 21/8405* (2013.01); *H04N 21/8456* (2013.01)

(56) References Cited

U.S. PATENT DOCUMENTS

| | | | |
|---|---|---|---|
| 6,714,791 B2 | 3/2004 | Friedman | |
| 6,993,535 B2 | 1/2006 | Bolle et al. | |
| 7,007,008 B2 | 2/2006 | Goel et al. | |
| 7,092,821 B2 | 8/2006 | Mizrahi et al. | |
| 7,136,875 B2 | 11/2006 | Anderson et al. | |
| 7,143,054 B2 | 11/2006 | Doherty | |
| 7,236,969 B1 | 6/2007 | Skillen et al. | |
| 7,337,462 B2 | 2/2008 | Dudkiewicz et al. | |
| 7,653,627 B2 * | 1/2010 | Li et al. ................... | 707/999.007 |
| 7,668,922 B2 | 2/2010 | Garbow et al. | |
| 7,680,786 B2 | 3/2010 | Koran | |
| 7,707,122 B2 | 4/2010 | Hull et al. | |
| 7,890,592 B2 | 2/2011 | Setiawan et al. | |
| 7,974,994 B2 | 7/2011 | Li et al. | |
| 8,060,520 B2 | 11/2011 | Koran | |
| 8,078,149 B2 | 12/2011 | Miyazawa | |
| 8,135,728 B2 | 3/2012 | Yih et al. | |
| 8,150,868 B2 | 4/2012 | Richardson et al. | |
| 8,189,963 B2 * | 5/2012 | Li et al. .......................... | 382/305 |
| 8,190,477 B2 | 5/2012 | Hoff et al. | |
| 8,209,617 B2 | 6/2012 | Vanderwende et al. | |
| 8,244,750 B2 | 8/2012 | Gade et al. | |
| 8,272,009 B2 | 9/2012 | Downey et al. | |
| 8,280,877 B2 | 10/2012 | Zhang et al. | |
| 8,301,710 B2 | 10/2012 | Setiawan et al. | |
| 8,462,160 B2 | 6/2013 | Lindsay et al. | |
| 8,554,852 B2 | 10/2013 | Burnim | |
| 8,601,004 B1 | 12/2013 | Mahadevan et al. | |
| 8,650,255 B2 | 2/2014 | O'Sullivan et al. | |
| 8,682,723 B2 | 3/2014 | Parsons et al. | |
| 8,682,839 B2 | 3/2014 | Li et al. | |
| 8,751,559 B2 | 6/2014 | Richardson et al. | |
| 8,782,133 B2 | 7/2014 | Coutts | |
| 2001/0047266 A1 * | 11/2001 | Fasciano ........................ | 704/278 |
| 2002/0088009 A1 * | 7/2002 | Dukiewicz et al. ........... | 725/136 |
| 2003/0126136 A1 | 7/2003 | Omoigui | |
| 2003/0188321 A1 * | 10/2003 | Shoff et al. .................... | 725/135 |
| 2004/0261027 A1 * | 12/2004 | Dillon et al. ................... | 715/723 |
| 2006/0212897 A1 | 9/2006 | Li et al. ........................... | 725/32 |
| 2007/0201558 A1 | 8/2007 | Xu et al. ................... | 375/240.22 |
| 2007/0260968 A1 * | 11/2007 | Howard et al. ............. | 715/500.1 |
| 2008/0007567 A1 * | 1/2008 | Clatworthy et al. ........... | 345/619 |
| 2008/0120646 A1 * | 5/2008 | Stern et al. ...................... | 725/34 |
| 2008/0276266 A1 * | 11/2008 | Huchital et al. ................. | 725/32 |
| 2009/0006191 A1 * | 1/2009 | Arankalle et al. .............. | 705/14 |
| 2009/0228921 A1 | 9/2009 | Miki et al. | |
| 2010/0005485 A1 * | 1/2010 | Tian et al. ........................ | 725/32 |

FOREIGN PATENT DOCUMENTS

| | | |
|---|---|---|
| KR | 10-2005-0111830 A | 11/2005 |
| KR | 10-2008-0022931 A | 3/2008 |
| KR | 10-2008-0053763 A | 6/2008 |
| KR | 10-2008-0053771 A | 6/2008 |
| KR | 10-2008-0091738 A | 10/2008 |
| KR | 10-2008-0099576 A | 11/2008 |
| KR | 10-2008-01719322 A | 12/2008 |

OTHER PUBLICATIONS

W. Yih, J. Goodman, and V. Carvalho, "Finding Advertising Keywords on Web Pages," Proceedings of the 15$^{th}$ World Wide Web Conference, May 24, 2006. pp. 1-10, Association for Computing Machinery, Inc., New York, NY, USA.

H. Li, D. Zhang, J. Hu, H. Zeng and Z. Chen, "Finding Keyword from Online Broadcasting Content for Targeted Advertising," Proceedings of the 1st international workshop on Data mining and audience intelligence for advertising, 2007, pp. 55-62, Association for Computing Machinery, Inc., New York, NY, USA.

* cited by examiner

SCRIPT(310)

EXECUTIVE DIRECTOR KANG: YOU WILL HAVE TROUBLE IN DEALING WITH ACTORS OR ACTRESSES WHO REGULARLY APPEAR IN PUBLIC ENTERTAINMENT PROGRAMS. SO, CHECK IN ADVANCE AND TAKE CARE OF ACTORS OR ACTRESSES THAT YOU ARE GOING TO WORK WITH.

DIRECTORS : (HALF-HEATEDLY) YES

EXECUTIVE DIRECTOR KANG: DON'T BE SO COMPLACENT. RO HONGCHUL HAS BEEN ON BAD TERMS WITH CHOI HANSOO AND PARK MYUNGJIN AFTER "BLUE SUN". SO, SCHEDULE FOR THEM TO NOT COME ACROSS EACH OTHER ON SET.

DIRECTOR RO: YES

FIG.3B

A CAPTION 320 WITH SYNCHRONIZATION INFORMATION

```
<SYNC Start=11755> <P Class=KRCC>
YOU WILL HAVE TROUBLE IN DEALING WITH ACTORS
OR ACTRESSES WHO REGULARLY APPEAR IN PUBLIC
ENTERTAINMENT PROGRAMS. <br>
SO, CHECK IN ADVANCE
<SYNC Start=15568> <P Class=KRCC>
ACTORS OR ACTRESSES THAT YOU ARE GOING TO WORK WITH <br>
TAKE CARE OF. <br>
<Font Color=#ffacb7> YES
<SYNC Start=19465> <P Class=KRCC>
DON'T BE SO COMPLACENT. RO HONGCHUL <br>
HAS BEEN ON BAD TERMS WITH PARK MYUNGJIN AND
CHOI HANSOO AFTER "BLUE SUN".
<SYNC Start=25459> <P Class=KRCC>
SCHEDULE FOR THEM TO NOT COME ACROSS EACH OTHER ON SET.
<br>
<Font Color=#ffacb7> YES
```

METHOD AND APPARATUS FOR EXTRACTING ADVERTISEMENT KEYWORDS IN ASSOCIATION WITH SITUATIONS OF VIDEO SCENES

CROSS-REFERENCE TO RELATED APPLICATION

This application claims the benefit under 35 U.S.C. §119 (a) of Korean Patent Application No. 10-2009-0014976, filed on Feb. 23, 2009, the disclosure of which is hereby incorporated by reference in its entirety for all purposes.

BACKGROUND

1. Field

The following description relates generally to video data processing and information retrieval, and more specifically, to a method and apparatus for extracting advertisement is keywords in association with the situations of video scenes.

2. Description of the Related Art

In general, television advertisements are presented (pre-roll) before a broadcast program starts, presented (mid-roll) by pausing a broadcast program while the advertisements are shown, or presented (post-roll) after a broadcast program has finished. In other words, television advertisements have been provided unilaterally to viewers. Meanwhile, recently, video content is being provided though various media including TV, Video On Demand (VOD) services, Internet Protocol TV (IPTV), and the like. Accordingly, demand for advertising to be suitable for these various methods of providing video contents is increasing.

For example, by exposing advertisement contents relating to the content of video currently being provided in synchronization with the reproducing time of the corresponding video scenes, highly effective advertising can be achieved while minimizing the reluctance of viewers to watch the advertisements. For example, in a scene in which a hero drives a nice car, an advertisement for the car can be revealed, or in a scene in which a character wearing stylish clothes or accessory appears, an advertisement for the clothes or accessory can be revealed.

In order to present advertisements most associated with the respective scenes of video currently being provided, advertisement keywords most suitable for the current scenes have to be extracted from script data of the video. Conventional web-based context advertising systems generally use a typical information retrieval technique to extract advertisement keywords. The information retrieval technique extracts advertisement keywords, using a statistical method such is as Term Frequency/Inverse Document Frequency (TF-IDF) based on appearance frequency of terms, or using characteristic information, such as information on where words are positioned in phrases or information on the lengths of phrases. Also, there is a conventional method which uses records on queries of previous users or analyzes and stores peripheral sentence patterns of keywords suitable to advertisements to thus extract keywords suitable to a corresponding sentence pattern as an advertisement keyword when they appear.

However, the conventional methods have difficulties in extracting keywords most suitable to a current situation because they process video scripts as if they were general documents without taking the characteristics of video scripts into consideration. That is, the conventional methods extract keywords by taking only dialog or sentences into consideration without analysis on the context of each scene. Accordingly, the conventional methods may fail to extract keywords most suitable for video since they could not utilize various factors, such as behaviors of characters, situation information, etc., that are useful for keyword extraction.

In other words, since the conventional methods use only appearance frequency of terms or general statistical data for keyword extraction without taking various characteristics of the video content into consideration, it is difficult to apply them to video.

SUMMARY

The following description relates to a method and apparatus that can extract effective advertisement keywords in association with the situations of individual scenes of video by configuring a situation classification hierarchy for the situations of video scenes, extracting situation information from a video script to classify a situation of each video scene and then extracting a relevant advertisement keyword according to the situation information.

In one general aspect, there is provided a method of extracting advertisement keywords in association with situations of scenes of video, including: establishing a knowledge database including a classification hierarchy for classifying situations of scenes of video and an advertisement keyword list, segmenting a video script corresponding to a received video in units of scenes, and determining a situation corresponding to each scene with reference to the knowledge database, and extracting an advertisement keyword corresponding to the situation of the scene with reference to the knowledge database.

The deciding of the situation of each scene may include inserting synchronization information into dialog of each video script segmented in units of scenes and performing text pre-processing tasks such as stopword removal, stemming and so on. The extracting of the advertisement keyword may include extracting the advertisement keyword by calculating relevancy between the situation of the scene and advertisement keywords listed in the advertisement keyword list stored in the database according to a statistical method.

In another general aspect, there is provided an advertising method to which information about situations of scenes of video is reflected, including: receiving a video, receiving a script corresponding to the video, segmenting the script in units of scenes and extracting an advertisement keyword corresponding to a situation of each scene, and combining advertisement contents corresponding to the extracted advertisement keyword with the video and providing the video combined with the advertisement contents.

In another general aspect, there is provided an apparatus suitable for extracting advertisement keywords in association with situations of scenes of video, including: a database configured to store a knowledge database including a classification hierarchy for classifying situations of scenes of video and an advertisement keyword list, a preprocessor configured to segment a received video script in units of scenes, to insert synchronization information into a script of each scene, and to perform text pre-processing tasks such as stopword removal, stemming and so on, and a keyword extractor configured to extract an advertisement keyword corresponding to the situation of the scene with reference to the database.

The keyword extractor may be further configured to extract the advertisement keyword by calculating relevancy between the situation of the scene and advertisement keywords listed in the advertisement keyword list stored in the database according to a statistical method. The preprocessor may be further configured to: compare dialog of the video script with dialog in captions, and add temporal information of the dialog in captions to the dialog of the video script at appropriate locations. The database may be further configured to: tag predetermined situation factors according to the questions words of "who," "where," "what," "why," "when," and "how;" and store the tagged predetermined situation factors in association with information of the questions words.

Other aspects, objects, features, and advantages will be apparent from the following description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. The progressions of processing steps and/or operations described are examples; however, the sequence of and/or operations is not limited to that set forth herein and may be changed as is known in the art, with the exception of steps and/or operations necessarily occurring in a certain order. Also, descriptions of well-known functions and constructions are omitted to increase clarity and conciseness.

Figure 1:
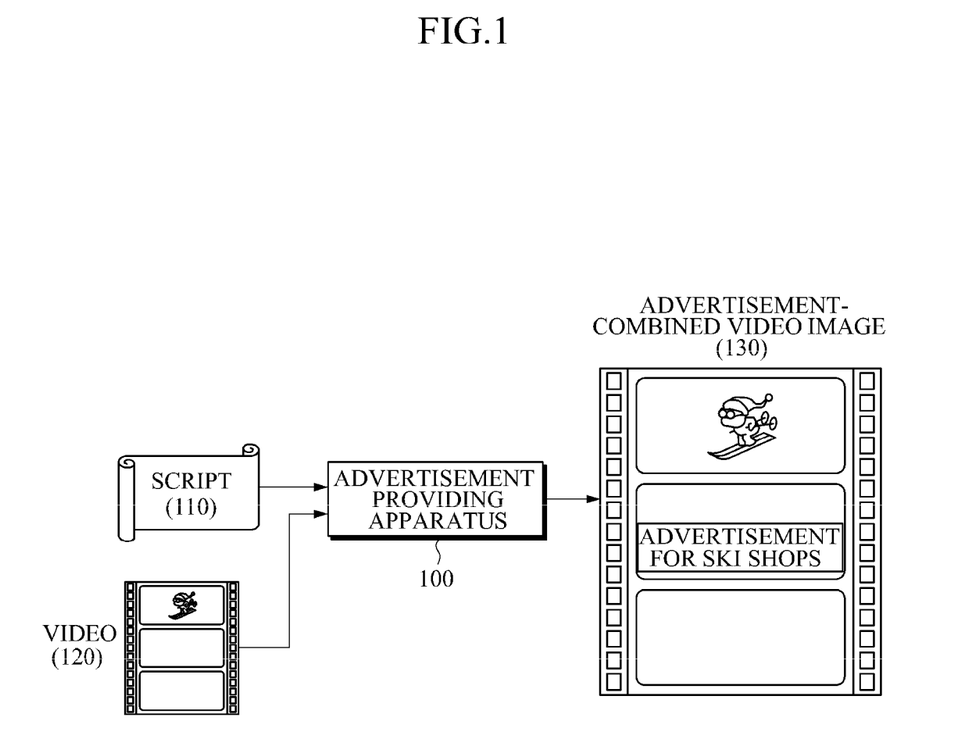
FIG. 1 is a conceptual diagram of an example of an advertising method.

FIG. 1 is a conceptual diagram for explaining an example of an advertising method. Referring to FIG. 1, an advertisement providing apparatus 100 according to an example embodiment receives a video 120 and a script 110 corresponding to the video 120, and outputs a video 130 with which relevant advertisements are combined. For example, if a video including a scene in which a hero is skiing is received, a keyword "ski" may be extracted as an advertisement keyword most suitable for the scene according to an advertisement keyword extracting method which will be described later, and accordingly advertisement contents about ski shops, etc. are combined with the video 120 and provided.

The advertisement contents may be provided in various ways, for example, the advertisement contents may be overlaid on a video, e.g., video 120, being currently provided or a video advertisement may occupy a part of a screen on which the video, e.g., video 120, is being displayed.

In other words, in response to a video 120 and a script 110 corresponding to the video 120 being received, the video 120 may be segmented in units of scenes and then relevant advertisement keywords may be extracted in association with the individual scenes. Then, advertisement contents related to the extracted advertisement keywords may be combined with the video 120 and then provided.

Figure 2:
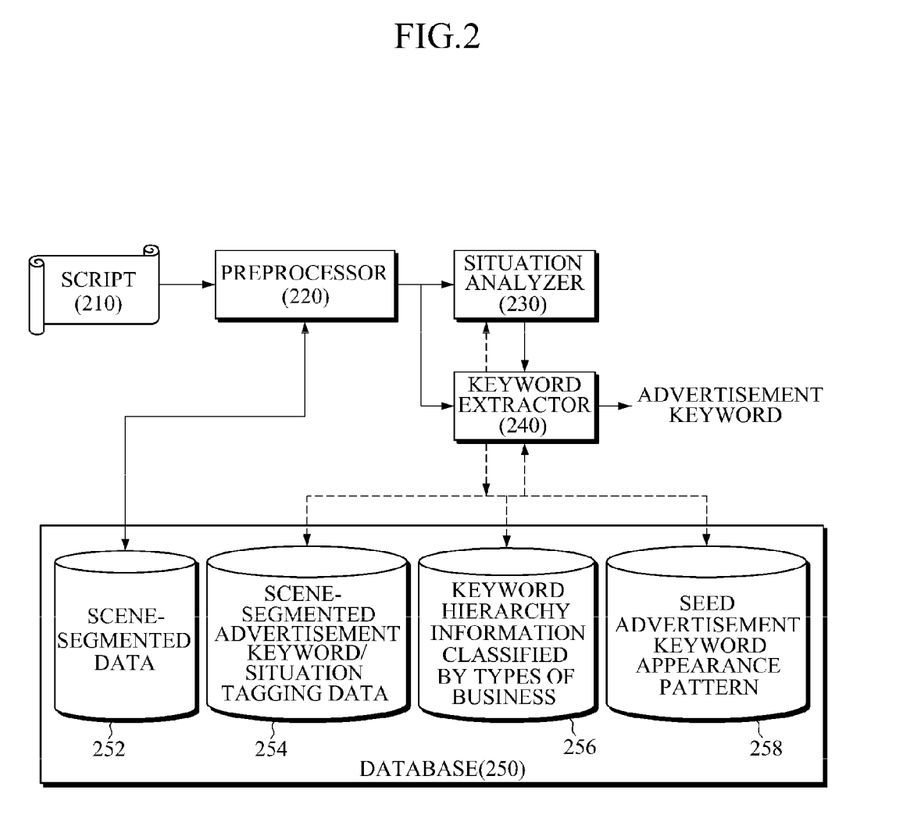
FIG. 2 is a block diagram of a configuration of an example of an advertisement keyword extracting apparatus.

FIG. 2 is a block diagram illustrating a configuration of an example of an advertisement keyword extracting apparatus. Referring to FIG. 2, the advertisement keyword extracting apparatus includes a preprocessor 220, a situation analyzer 230, a keyword extractor 240, and a database 250. The preprocessor 220 may segment a received video script 210 in units of scenes, insert synchronization information into a script of each scene, and then perform morpheme analysis. That is, the preprocessor 220 may perform caption synchronization, scene segmentation, and language processing so that the situation analyzer 230 and the keyword extractor 240 can easily process the received script 210.

Figure 3A:
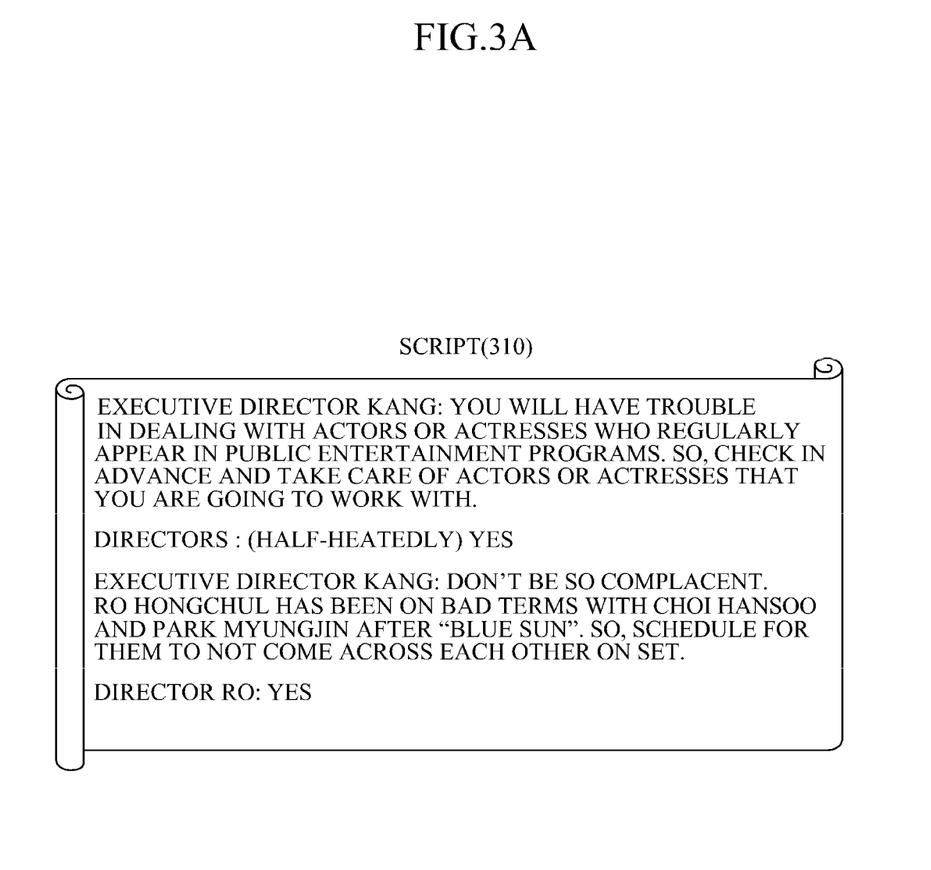
FIG. 3A is a conceptual diagrams showing an example of a script.
Figure 3B:
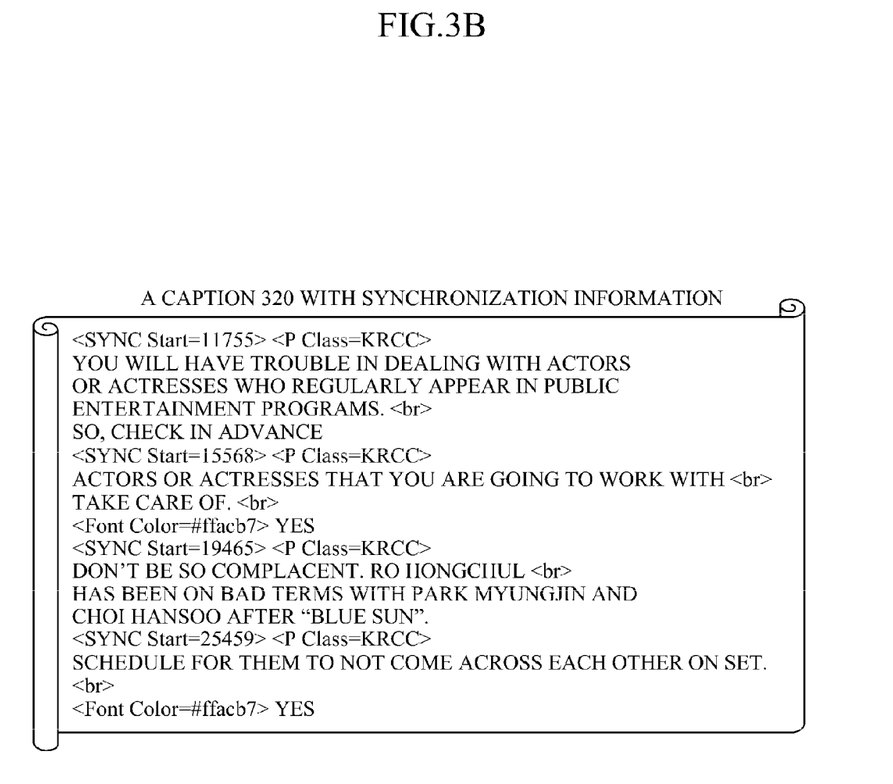
FIG. 3B is an example of a caption in which synchronization information is inserted.

For example, first, the preprocessor 220 may compare dialog of the video script 210 with dialog in captions, and then may add temporal information of each dialog in captions to a corresponding dialog of the video script 210 at an appropriate location. In other words, in order to gain temporal information not included in the video script 210, the preprocessor 220 may detect temporal information of dialog in captions to thus add the temporal information to the video script 210. An example of synchronization between scripts and captions will be described later with reference to FIG. 3.

Then, the preprocessor 220 may perform scene segmentation to segment the script 210 into appropriate lengths. Since the situation of the video 120 (see FIG. 1) may vary over time, the scene segmentation may be performed in consideration of variations in place or time, variation in characters, coherence and similarity in conversation, and so on.

Also, the preprocessor 220 may perform language processing, including basic language processing such as text preprocessing tasks (e.g., stopword removal, stemming, etc.) on captions and processing on ungrammatical expressions, loan words, etc. For example, the preprocessor 220 may perform language processing to remove auxiliary words irrelevant to keyword extraction. In this way, the preprocessor 220 may extract keywords for each scene, insert temporal synchronization information indicating when the keywords appear into the scripts, store the scripts as scene-segmented data 252, and then transfer the scene-segmented data 252 to the situation analyzer 230 and the keyword extractor 240.

The situation analyzer 230 may decide a situation corresponding to each scene processed by the preprocessor 230 with reference to the database 250.

In order for the situation analyzer 230 to analyze and classify various situations extracted from the script 210 and processed by the preprocessor 220, a situation classification hierarchy may be needed. The situation classification hierarchy may be created by configuring situation classes that are representative of various situations of video scenes.

For example, a situation class "health" may be representative of exercising scenes or hospital scenes, and a situation class "conflict" may be representative of situations, such as struggle, dispute, threat, quarrel, and the like.

The situation analyzer 230 may extract factors necessary to definitely classify a situation from the script 210. That is, the situation analyzer 230 may receive a scene-segmented script 210 and may output information about various factors of the corresponding scenes. The factors of the corresponding scenes may be extracted by an existing document classifier using a general feature extraction method. Here, factors that satisfy the question words of "when," "where," "who," "what," "why," and "how" may be extracted and used as situation information. For example, a scene set in a traveling airplane may be expressed as follows.

<SCENE><SITUATION> travel </SITUATION><WHERE> in airplane </WHERE>, <WHEN> day </WHEN> air hostess, if serving passengers while passing by pushing a service trolley, <WHO> a man and woman </WHO>, sitting in comfort, in the seat <WHAT>, card game </WHAT></SCENE>.

The factors that are representative of situations may have been established in advance by an expert group and then stored in the database 250. When words included in a received script 210 match any of the stored factors, information about situations corresponding to the matching factors may be automatically extracted from the database 250 and stored as scene-segmented advertisement keyword/situation tagging data 254.

Then, the situation analyzer 230 may perform situation classification using the extracted situation information to predict a group of situation classes having high relevancy. For example, the situation analyzer 230 may predict a situation of the corresponding scene based on the established situation classification system in view of learning-based text categorization. An existing SVM (Support Vector Machine) or a MaxEnt (Maximum Entropy) classifier may be utilized as a learning-based classifier.

The database 250 may store data including the situation classification hierarchy and an advertisement keyword list. The data may include keyword hierarchy information 256 classified by the types of business and a seed advertisement keyword appearance pattern 258, as well as the scene-segmented data 252 and scene-segmented advertisement keyword/situation tagging data 254 as described above.

Then, the keyword extractor 240 may extract advertisement keywords corresponding to the situation of each scene with reference to the database 250.

At this time, the keyword extractor 240 may extract advertisement keywords by calculating relevancy between the extracted situation information and the keywords established in the database 250 according to a statistical method.

The keyword extractor 240 may extract the advertisement keywords, using the processing results of the situation analyzer 230 and data including an advertisement keyword list classified by the types of business, which may be stored in the database 250. The situation information may include information regarding a situation class to which the corresponding scene belongs, and information regarding relevancy between keywords and situation classes. The relevancy information may be pointwise mutual information (PMI) using co-occurrence information. For example, the relevancy information may be represented as a PMI value that is calculated by Equation 1 as follows.

$$PMI(t, s) = \log_2 \frac{p(t, s)}{p(t) \cdot p(s)} \approx \frac{\text{count}(t, s)}{\text{count}(t, s) \cdot \text{count}(s)}, \quad (1)$$

where count(t,s) is the number of times a keyword t appears in a situation s, count (t) is the appearance frequency of the keyword t, and count(s) is the number of all words belonging to a scene that corresponds to the situation s.

The situation information may also be calculated using a difference between a PMI value of a keyword and a mean PMI value of all the remaining words. The greater difference may result in the higher probability of the keyword to be selected as an advertisement keyword.

Along with the situation-associated factors, various other factors may be extracted according to an existing method to extract text characteristics. For example, weights of keywords may be obtained through a statistical method such as TF-IDF, and weights of keywords that are often used in advertisements can be adjusted using information on appearance frequency of keywords from the advertisement keyword list classified by the types of business. Also, a keyword weighting method, using statistical information of the previous scene or sentence pattern analysis based on sequential pattern mining, may be considered. Various pieces of information acquired in these ways may be considered to be independent and can be linearly-combined with situation information, and a ranked advertisement keyword list may be extracted.

FIGS. 3A and 3B show an example of a video script 310 and an example of a caption in which synchronization information is inserted. For synchronization between scripts and captions, temporal information of captions may be used to gain temporal information not included in the video script 310. Since dialog may exist in both the script 310 and captions, by comparing dialog of the script 310 with those of the captions, temporal information of the captions may be appropriately attached to the script 310, and a caption 320 into which synchronization information is inserted may be obtained.

Referring to FIGS. 3A and 3B, since the script 310 may include stage notes including information on scene locations, time of day, etc., together with dialog, and captions include only dialog, captions 320 into which the synchronization information has been inserted may include dialog and information on the start times of the individual dialog.

Figure 4:
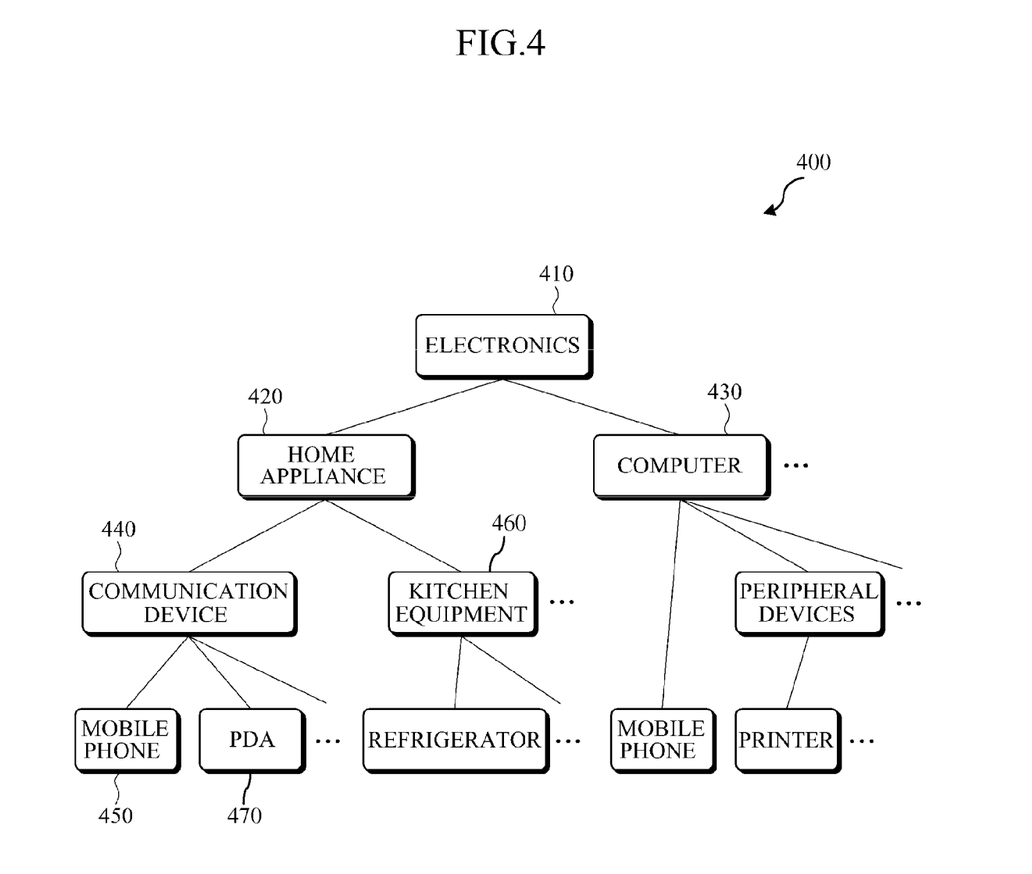
FIG. 4 is a block diagram of an example of an advertisement keyword class hierarchy.

FIG. 4 illustrates an example of an advertisement keyword class hierarchy 400. For example, an upper keyword "electronics" 410 may be branched into lower keywords 420 and 430 such as "home appliance" and "computer," and the keyword "home appliance" 420 may be branched into lower keywords such as "communication device" 440 and "kitchen equipment" 460. Also, the keyword "communication device" 440 may be subdivided into more detailed keywords, such as "mobile phone" 450, "PDA" 470, and the like.

Accordingly, in response to a certain scene being determined to correspond to a category of "electronics" 410, an advertisement that will be displayed may be selected with respect to the keyword class hierarchy 400.

Figure 5:
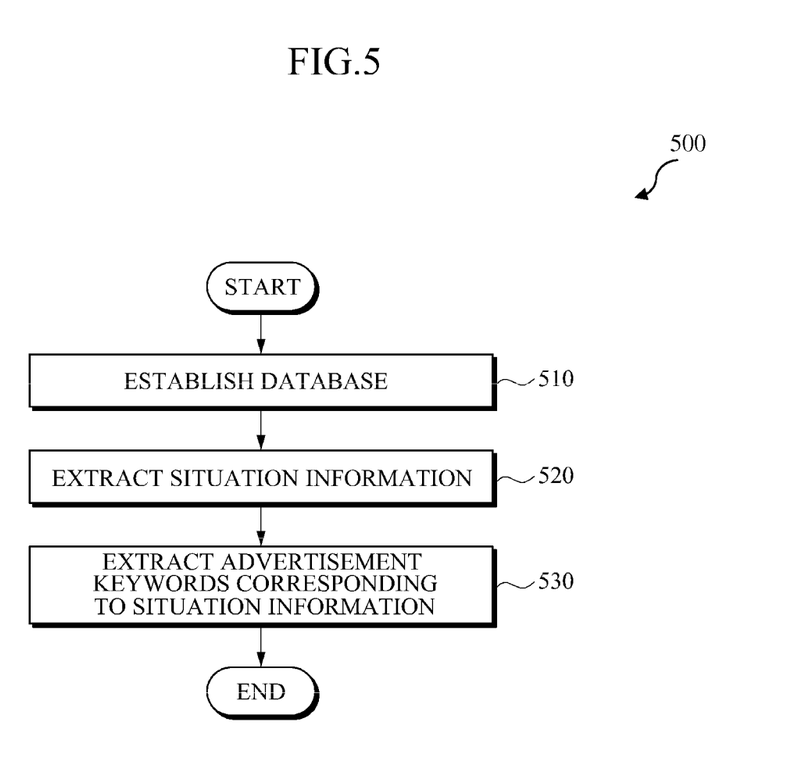
FIG. 5 is a flowchart of an example of an advertisement keyword extracting method.

FIG. 5 is a flowchart of an example of an advertisement keyword extracting method 500. First, data including a situation classification hierarchy and an advertisement keyword list may be established as a database (operation 510). Details about the database have been described above with reference to FIG. 2. Then, a received video script may be segmented in units of scenes and a situation corresponding to each scene may be decided with reference to the database (operation 520). For example, a received video script may be segmented in units of scenes, synchronization information may be inserted into a script of each scene to perform morpheme analysis and then a situation corresponding to the scene may be determined with reference to the database.

Then, advertisement keywords corresponding to the circumstances of each scene may be extracted with reference to the database (operation 530). That is, relevancy between the extracted situation information and keywords established in the database may be calculated according to a statistical method, thus extracting relevant advertisement keywords.

According to an example embodiment, by very frequently displaying advertisements associated with video currently being provided to present a larger amount of advertisements than TV advertisements, an effect of lowering the cost of advertisement may be obtained.

Furthermore, since advertisements suitable for a situation of video being currently reproduced may be provided, highly effective advertising may be expected to be achieved. The advertisements may be provided on any environment that serve video contents, and also may be applied to web services that provide video contents through the Internet environment or to video services that serve on a video player in connection with the Internet. Also, the advertisements may be applied to internet-connectable TV sets or IPTV environments.

In addition, according to an example embodiment, by providing advertisements using advertisement keywords most suitable for scenes of video currently being provided, advertisers may easily associate their advertisements with target scenes.

Meanwhile, audiences may satisfy their curiosity about objects or places that appear on TV programs or video contents, and accordingly, advertisers may get increased sales by taking advantages of direct purchasing or reservations made by audiences.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, non-transitory media, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. The computing system may further include a display device for electronic transformation of the data into a visual depiction.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Disclosed are a method and apparatus for extracting advertisement keywords in association with situations of scenes of video. In the advertisement keyword extracting method, a video script corresponding to a received video is segmented in units of scenes, a situation corresponding to each scene is decided and an advertisement keyword suitable for the situation of the scene is extracted. Accordingly, since advertisements suitable for a situation of video currently being reproduced are provided, highly effective advertising is expected to be achieved.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of extracting advertisement keywords in association with situations of scenes of video, the method comprising:
 comparing, by a processor, dialog of a video script of the video with dialog in captions of the video;
 adding temporal information of the dialog in the captions to the dialog of the video script at appropriate locations of the dialog of the video script based on the comparison;
 segmenting the video script into the scenes;
 determining the situations of the respective scenes based on a classification hierarchy; and
 extracting the advertisement keywords of the respective situations from an advertisement keyword list.

2. The method of claim 1, further comprising:
 pre-processing the captions, the pre-processing comprising stopword removal and stemming.

3. The method of claim 1, wherein the extracting comprises:
 calculating a relevancy between a situation, among the situations, and each of advertisement keywords listed in the advertisement keyword list based on a statistical method; and
 extracting an advertisement keyword of the situation from the advertisement keyword list based on the calculation.

4. An apparatus configured to extract advertisement keywords in association with situations of scenes of video, the apparatus comprising:
 a database configured to store a database comprising an advertisement keyword list;
 a processor configured to
  compare dialog of a video script of the video with dialog in captions of the video,
  add temporal information of the dialog in the captions to the dialog of the video script at appropriate locations of the dialog of the video script based on the comparison, and
  segment the video script into the scenes;
 a situation analyzer configured to determine the situations of the respective scenes based on a classification hierarchy; and
 a keyword extractor configured to extract the advertisement keywords of the respective situations from the advertisement keyword list.

5. The apparatus of claim 4, wherein the keyword extractor is further configured to:
 calculate a relevancy between a situation, among the situations, and each of advertisement keywords listed in the advertisement keyword list based on a statistical method; and extract an advertisement keyword of the situation from the advertisement keyword list based on the calculation.

6. The apparatus of claim 4, wherein the database is further configured to:
   tag predetermined situation factors with respective question words of "who", "where", "what", "why", "when", and "how"; and
   store the tagged predetermined situation factors.

7. The apparatus of claim 6, wherein the situation analyzer is further configured to:
   determine whether words in the video script match one or more of the tagged predetermined situation factors; and
   in response to the words being determined to match the one or more of the tagged predetermined situation factors, extract, from the database, the matched one or more of the tagged predetermined situation factors, and determine a situation, among the situations, of a scene, among the scenes, based on the extracted one or more of the tagged predetermined situation factors.

8. The apparatus of claim 4, wherein the processor is further configured to:
   pre-process the captions, the pre-processing comprising stopword removal and stemming.

9. The apparatus of claim 4, wherein the advertisement keyword list comprises a hierarchy classified by a type of business.

10. The apparatus of claim 4, wherein the keyword extractor is further configured to:
    calculate a relevancy between a situation, among the situations, and an advertisement keyword, among advertisement keywords listed in the advertisement keyword list, based on a number of times the advertisement keyword appears in the situation, an appearance frequency of the advertisement keyword, and a number of words in a scene corresponding to the situation; and
    extract an advertisement keyword of the situation from the advertisement keyword list based on the calculation.

11. The apparatus of claim 10, wherein the keyword extractor is further configured to:
    determine a difference between the relevancy and a mean relevancy of the advertisement keywords listed in the advertisement keyword list; and
    extract the advertisement keyword of the situation from the advertisement keyword list based on the difference.

* * * * *